Sept. 16, 1952  P. REBMANN  2,610,897

ROLLER SKATE ANTIFRICTION BEARING

Filed Nov. 29, 1949

Inventor
Paul Rebmann
Barthel & Bugbee
Attorneys

By

Patented Sept. 16, 1952

2,610,897

UNITED STATES PATENT OFFICE 2,610,897

ROLLER SKATE ANTIFRICTION BEARING

Paul Rebmann, Wayne, Mich.

Application November 29, 1949, Serial No. 130,020

2 Claims. (Cl. 301—5.7)

This invention relates to roller skates and, in particular to roller skate wheels and axle units.

In roller skates of conventional types, the rollers are ordinarily of wood, such as maple, as wood seems to have the best qualities for such purposes when skating upon a wooden floor. Consequently, wood rollers are preferred by expert skaters to those of metal, fiber or other material. When subjected to hard usage, however, as in jumping or acrobatics, wood rollers occasionally split and sometimes break in two. In the ordinary roller skate, this has three serious defects. The first, and more immediate defect, is that the end of the axle immediately digs into the floor, not only marring the floor by halting the skate suddenly and probably throwing the skater to the floor with possible serious injuries. Secondly, when the wheel or roller is to be replaced, it is necessary to take the entire bearing apart, if it has not already separated and its rollers become lost or damaged. Thirdly, the rollers cannot be replaced or changed without disassembling the bearings into several parts. The present invention eliminates all of these defects by providing a roller bearing which will continue to roll even though the wood roller splits off, and which does not separate or lose any of its parts. Moreover, in the present invention, the roller can be changed without disassembling the bearing.

One object of this invention is to provide a roller skate bearing which will remain in position without shedding any of its parts, even though the roller splits off completely and becomes separated.

Another object is to provide a roller skate antifriction bearing which will continue to roll on the floor, even though the roller itself breaks away, thereby preventing damage to the floor and possible injury to the skater.

Another object is to provide a roller skate antifriction bearing in which rollers can be removed and interchanged without disturbing or disassembling the bearing.

Figures 1, 2, 3:
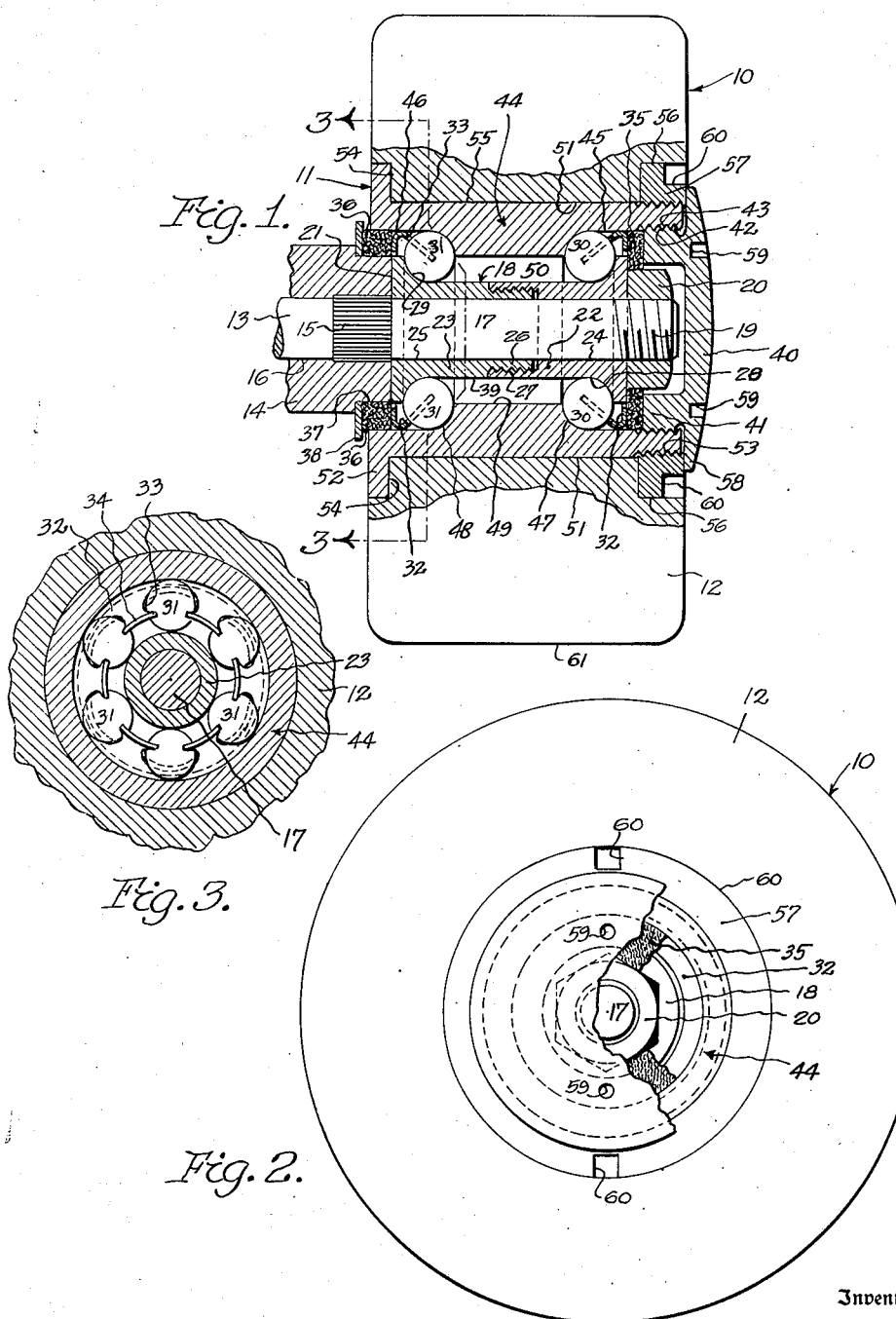
Figure 1 is a central vertical section, partly in elevation, of a roller skate wheel and axle assembly employing the roller skate anti-friction bearing construction of the present invention.
Figure 2 is a side elevation of the wheel and axle assembly of Figure 1, with a portion of the closure disc and oil ring broken away to disclose the interior construction.
Figure 3 is a fragmentary cross-section taken along the line 3—3 in Figure 2.

Referring to the drawings in detail, Figures 1 and 2 show a roller skate wheel and axle assembly, generally designated 10, as including an anti-friction bearing unit, generally designated 11 rotatably supporting a roller 12 upon an axle 13 mounted in a carriage 14. The carriage 14 is in turn connected to the usual conventional foot platform or support (not shown) and the remainder of the skate may be of any suitable type, the details of which are beyond the scope of the present invention.

The axle 13 is preferably knurled as at 15 to prevent it from rotating in the bore 16 of the carriage 14, has a projection 17 for receiving the inner race, generally designated 18 of the antifriction bearing 11. The outer end of the axle portion 17 is threaded as at 19 to receive a nut 20 for holding the inner race 18 in assembly against the end 21 of the carriage 14 as an abutment.

The inner race 18 is in two portions 22 and 23 having aligned bores 24 and 25 respectively for receiving the axle portion 17. The portion 23 is provided with a reduced diameter threaded end portion 26 which is threaded into a correspondingly threaded bore 27 in the end of the race portion 22. The inner race portions 22 and 23 are thus separable from one another at the threaded junction 26, 27 and at their opposite ends are provided with annular curved raceways 28 and 29 respectively receiving double rows of bearing balls 30 and 31. Oppositely facing cages or ball retainers 32 of annular form have apertures 33 for receiving the balls 30 and 31, and portions 34 (Figure 3) extend between the balls to space them properly around the raceway 28 or 29. The ends of the retainers 32 are engaged by oil rings 35 and 36 of felt or other suitable material for keeping the lubricant in the bearing and also for keeping dust out. The oil ring 36 is mounted on a reduced diameter portion 37 of the carriage 14 and is backed up by a washer 38. The inner race 18 is provided with a central surface 39 interconnecting the raceways 28 and 29.

The felt oil ring 35 is held in position by an end cap or closure disc 40 having an annular flange 41 projecting inwardly and provided with a threaded portion 42 which is threaded into a correspondingly threaded bore 43 in a hollow cylindrical outer bearing race, generally designated 44. The latter has counterbores 45 and 46 extending inwardly from the opposite ends thereof terminating in annular curved raceways 47 and 48 configured similarly to the raceways 28 and 29 and placed oppositely to them (Figure 1). The bores 45 and 46 contain the double rows of balls 30 and 31 together with their retainers 32 and oil rings 35 and 36. The raceways 47 and 48 are interconnected by a smaller diameter bore 49 which, however, is sufficiently larger in diameter than the central portion 39 of the inner race 18 to provide an annular clearance space and lubricant chamber 50 between the outer and inner bearing races 44 and 18.

The outer race 14 is provided with a cylindrical outer surface 51 (Figure 1) terminating at its inner end in an annular flange 52 and at its outer end in a threaded portion 53. The flange 52 fits into a correspondingly spaced annular recess 54 in the end of the bore 55 extending through the roller 12, whereas a similar recess 56 is provided in the opposite end thereof for receiving an internally threaded annular retaining ring 57 threaded upon the threaded portion 53 of the outer race 44. The closure disc 40 is provided with a peripheral flange 58 which extends outward a sufficient distance to engage the outer end of the retaining ring 57 so as to hold it in position. The closure disc 40 and retaining ring 57 are provided with diametrically spaced recesses or sockets 59 and 60 respectively (Figure 2) for receiving a conventional spanner wrench.

In the operation of the invention, the parts are assembled as shown in Figure 1 with the retaining ring 57 tightly threaded upon the threaded portion 53 of the outer race 44 and with the end cap or closure disc 40 screwed firmly into closing and retaining position. The skater then uses the skates in the ordinary way, the peripheries 61 of the rollers 12 rolling upon the floor as the skater moves over the floor. If the skater wishes to change to smaller or larger rollers 12, he merely removes the end cap 40 and retaining ring 57 by means of an ordinary spanner wrench, and thereafter pushes the roller 12 off the surface 55 of the outer race 44 by pressure on the end adjacent the flange 52. He then substitutes another roller 12 of the desired diameter by pushing it upon the outer race surface 55 by end pressure in the reverse direction until its inner end recess 54 passes over the flange 52 of the outer race 44 into the position shown in Figure 1. He then replaces the retaining ring 57 and end cap 40 by a reverse motion to that employed in removing them. Thus, the bearing 11 itself has been completely undisturbed in changing the roller 12, and its adjustments remain constant. In this manner, damaged or worn rollers 12 may be easily and quickly replaced at small expense without disturbing the bearing adjustments.

If the skater splits a roller 12 while he is skating and the halves of the roller break away from the bearing 11, the outer race 44 of the bearing 11 will touch the floor and, since it is supported on the anti-friction balls 30 and 31, will continue to roll on the flange 52 and retaining ring 57. Thus, the rolling of the skate will not be halted abruptly as in prior roller skates, and little or no damage to the floor will result. Moreover, the axle 19 and nut 20 will be prevented from digging into the floor and halting the skate, as in prior skates. Furthermore, the bearing balls 30 and 31 and all other parts of the bearing are retained within the bearing 11 itself and cannot separate and roll away, thereby causing possible accidents to other skaters as well as inconvenience to all concerned. A new roller 12 can immediately be installed by removing the end cap 40 and retaining ring 57 in the manner previously described.

The threaded connection 26, 27 between the two opposed inner race portions 22 and 23 is obviously only one of various ways of holding these parts together. Alternatively, the parts 22 and 23 may be secured to one another by a simple unthreaded press fit, by a bayonet joint at the locations 26 and 27, or they may merely be permitted to abut one another, since they are already held in assembly against the end 21 of the carriage 14 by the nut 20 threaded upon the threaded portion 19 of the axle 17.

What I claim is:

1. An anti-friction bearing unit for a roller skate wheel and axle assembly comprising an inner race having a bore therethrough for receiving the axle and having an annular raceway, a pair of rows of bearing balls mounted in said raceway, an outer race encircling said inner race and having an annular raceway engaging said bearing balls, said outer race having an outer surface configured to receive the skate roller, said outer race having a roller abutment portion at one end thereof and having its opposite end threaded, an annular threaded roller retaining element threaded upon said threaded end, said outer race having an internally bored outer end portion, and an end closure element secured in said bore, said closure element having an outwardly projecting portion extending outwardly into the path of said roller-retaining element.

2. An anti-friction bearing unit for a roller skate wheel and axle assembly comprising a tubular inner race having a bore therethrough for receiving the axle and having a pair of spaced annular raceways, a pair of rows of bearing balls mounted in said raceways, a tubular outer race encircling said inner race and having a pair of spaced annular raceways engaging said bearing balls, said outer race having an outer surface configured to receive the skate roller, said outer race having a roller abutment portion at one end thereof and having its opposite end threaded, an annular threaded roller retaining element threaded upon said threaded end, said outer race having an internally bored outer end portion, and an end closure element secured in said bore, said closure element having an outwardly projecting portion extending outwardly into the path of said roller retaining element.

PAUL REBMANN.

REFERENCES CITED

The following references are of record in the file of this patent:

UNITED STATES PATENTS

| Number | Name | Date |
|---|---|---|
| 801,835 | Apelt | Oct. 17, 1905 |
| 1,033,271 | Robinson | July 23, 1912 |
| 1,549,509 | Schluesselburg | Aug. 11, 1925 |
| 1,749,502 | Nielsen | Mar. 4, 1930 |
| 2,048,916 | Bontzlin | July 28, 1936 |
| 2,252,132 | Mazveskas et al. | Aug. 12, 1941 |
| 2,440,650 | Batesole | Apr. 27, 1948 |

FOREIGN PATENTS

| Number | Country | Date |
|---|---|---|
| 549,167 | Great Britain | Nov. 9, 1942 |